(12) United States Patent
Easley, Jr. et al.

(10) Patent No.: US 8,234,864 B2
(45) Date of Patent: Aug. 7, 2012

(54) ENGINE SYSTEM HAVING MULTI-STAGE TURBOCHARGING AND EXHAUST GAS RECIRCULATION

(75) Inventors: William Lanier Easley, Jr., Dunlap, IL (US); David Andrew Pierpont, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 802 days.

(21) Appl. No.: 12/314,765

(22) Filed: Dec. 16, 2008

(65) Prior Publication Data

US 2010/0146965 A1    Jun. 17, 2010

(51) Int. Cl.
*F02D 23/00* (2006.01)
*F02B 33/34* (2006.01)

(52) U.S. Cl. ............................. 60/602; 60/605.2; 60/612
(58) Field of Classification Search .................... 60/602, 60/610–612, 605.2
See application file for complete search history.

(56) References Cited

U.S. PATENT DOCUMENTS

| | | | |
|---|---|---|---|
| 2,387,560 A | 10/1945 | Boulet | |
| 3,257,797 A * | 6/1966 | Lieberherr | .................. 60/599 |
| 3,941,104 A | 3/1976 | Egli | |
| 4,344,289 A | 8/1982 | Curiel et al. | |
| 4,400,945 A | 8/1983 | Deutschmann et al. | |
| 4,638,634 A | 1/1987 | McLean | |
| 5,109,674 A | 5/1992 | Sudmanns | |
| 5,560,207 A | 10/1996 | Ramsden et al. | |
| 5,692,378 A | 12/1997 | Ramsden | |
| 5,697,217 A | 12/1997 | Ramsden et al. | |
| 6,321,538 B2 | 11/2001 | Hasler | |
| 6,694,736 B2 | 2/2004 | Pflüger | |
| 6,973,787 B2 | 12/2005 | Klingel | |
| 7,310,947 B2 | 12/2007 | Baumann | |
| 7,571,608 B2 * | 8/2009 | Boyapati et al. | ................ 60/612 |
| 2006/0042247 A1 | 3/2006 | Haugen | |

FOREIGN PATENT DOCUMENTS

CN    200985826 Y    12/2007

OTHER PUBLICATIONS

U.S. Appl. No. 12/222,011, filed Jul. 31, 2008, 17 pages.
U.S. Appl. No. 12/285,145, filed Sep. 30, 2008, 14 pages.

* cited by examiner

*Primary Examiner* — Tran Nguyen
*Assistant Examiner* — Leda Pham
(74) *Attorney, Agent, or Firm* — Finnegan, Henderson, Farabow, Garrett & Dunner LLP

(57) ABSTRACT

An engine system is disclosed. The engine system includes an engine, an intake system for providing intake air to the engine and an exhaust system receiving exhaust gas from the engine. The engine system also includes a first exhaust turbine arranged downstream of the engine and a second and third exhaust turbines coupled in parallel and arranged downstream of the first exhaust turbine. A first valve is associated with the second and third exhaust turbines, the first valve configured to at least partially restrict exhaust gas to one of the second and third exhaust turbines and increase exhaust gas to the other turbine. The engine system also includes an exhaust gas recirculation system configured to redirect at least a portion of exhaust gas from the exhaust system to the intake system.

20 Claims, 2 Drawing Sheets

ENGINE SYSTEM HAVING MULTI-STAGE TURBOCHARGING AND EXHAUST GAS RECIRCULATION

TECHNICAL FIELD

The present disclosure is directed to an engine system and, more particularly, an engine system having multi-stage turbocharging and exhaust gas recirculation (EGR).

BACKGROUND

A combustion engine, such as a diesel engine, a gasoline engine, and a gaseous fuel powered engine, is supplied with a mixture of air and fuel for combustion within combustions chambers of the engine to generate mechanical power output. The engine may include a turbocharger to help increase the power output generated by this combustion process. This typically includes a turbine driven by exhaust gases of the engine and a compressor driven by the turbine. The compressor receives a fluid, typically in the form of intake air, and supplies the compressed intake air to the combustions chambers. The turbocharger increases engine power by forcing more air into the combustion chambers than would otherwise be possible. This increased amount of intake air in the combustion chambers allows for higher combustion pressures that increase the power output generated by the engine.

In addition to increasing engine power output and efficiency, it is desirable to simultaneously minimize exhaust emissions. Combustion engines exhaust a complex mixture of air pollutants as byproducts of the combustion process, and due to increased attention to the environment, exhaust emissions standards have become more stringent. The amount of pollutants emitted to the atmosphere from an engine can be regulated depending on the type of engine, size of engine, and/or class of engine.

One method that has been implemented to help comply with the regulation of these exhaust emissions includes utilizing an exhaust gas recirculation (EGR) system. EGR systems operate by recirculating a portion of the exhaust produced by the engine back to the intake of the engine to mix with fresh air. The resulting mixture has a lower combustion temperature and, subsequently, produces a reduced amount of regulated pollutants.

U.S. Pat. No. 6,694,736 B2 issued to Plfüger on Feb. 24, 2004 (the '736 patent) discloses a turbocharged internal combustion engine with a plurality of exhaust turbines, including a high-pressure stage turbocharger set, a low-pressure stage turbocharger arranged downstream of the high-pressure stage turbocharger set, and an exhaust return flow for feeding exhaust to the intake air of the engine. The high-pressure stage turbocharger set includes two high-pressure turbines arranged in parallel, and the low-pressure stage turbocharger is arranged in series with the two high-pressure stage turbines. The multi-stage turbine system provides high boost pressure, and thus, increased power output of the engine.

Although the engine system of the '736 patent may provide high boost for higher engine power applications, it may have limitations. For example, the single low-pressure turbine of the low-pressure stage may have poor efficiency at high boost production levels.

The engine system of the present disclosure is directed towards improvements to existing technology.

SUMMARY OF THE DISCLOSURE

One aspect of the present disclosure is directed to an engine system. The engine system may include an engine, an intake system for providing intake air to the engine, and an exhaust system receiving exhaust gas from the engine. The engine system may also include a first exhaust turbine arranged downstream of the engine and a second and third exhaust turbines coupled in parallel and arranged downstream of the first exhaust turbine. A first valve may be associated with the second and third exhaust turbines, the first valve configured to at least partially restrict exhaust gas to one of the second and third exhaust turbines and increase exhaust gas to the other turbine. The engine system may also include an exhaust gas recirculation system configured to redirect at least a portion of exhaust gas from the exhaust system to the intake system.

Another aspect of the present disclosure is directed to a method of directing exhaust gas of an engine system, the engine system including an engine, an intake system for providing intake air to the engine, and an exhaust system receiving exhaust gas from the engine. The method may include directing exhaust gas from the engine to a first exhaust turbine arranged downstream from the engine and directing exhaust gas from the first exhaust turbine to a second and third exhaust turbines coupled in parallel, the second exhaust turbine being arranged downstream of the first exhaust turbine. The method may also include increasing boost pressure supplied by the intake system to the engine by selectively cutting off exhaust gas to one of the second and third exhaust turbines and directing at least a portion of exhaust gas from the exhaust system to the intake system.

DETAILED DESCRIPTION

Figure 1:
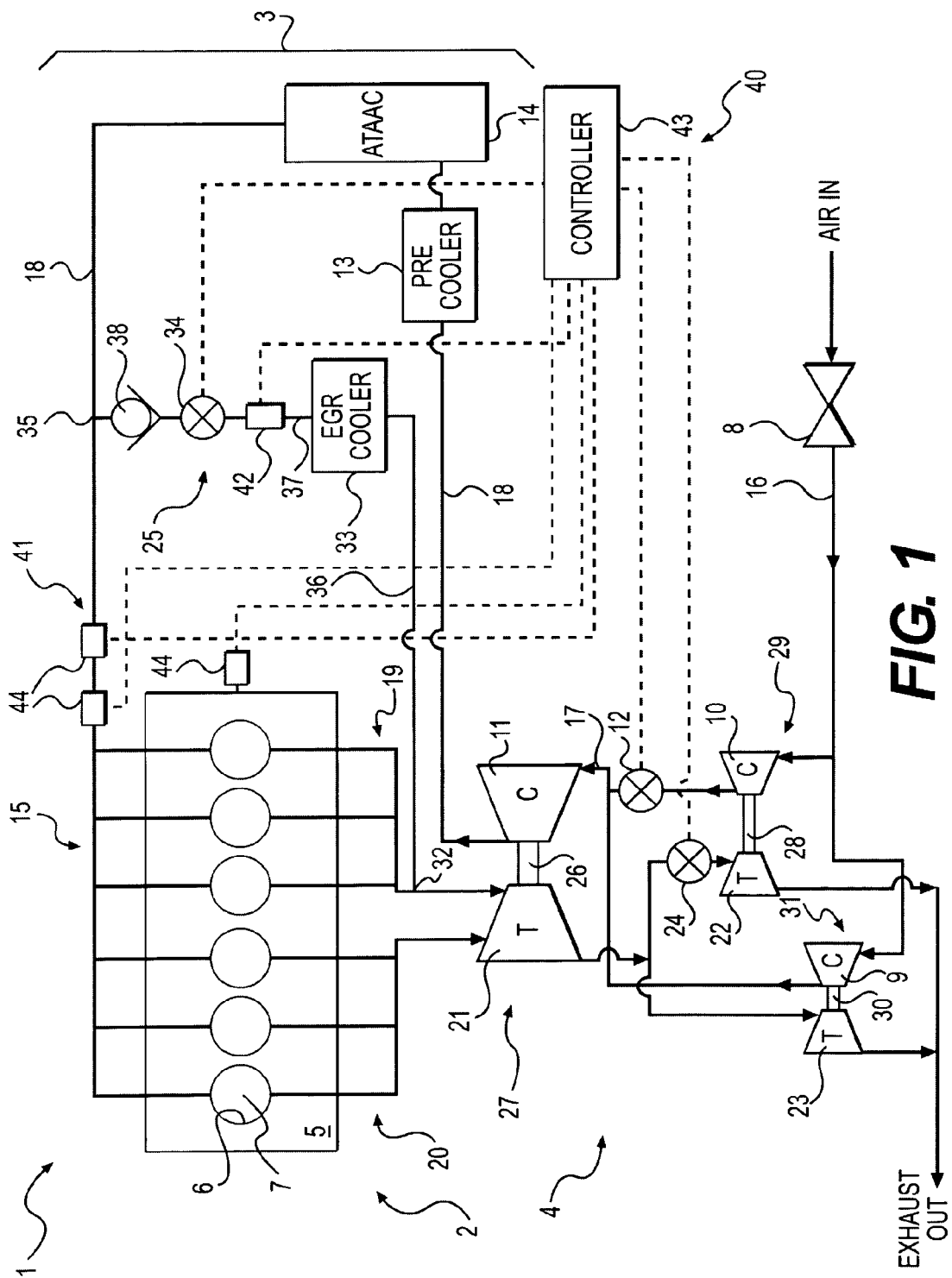
FIG. 1 is a diagrammatic illustration of an engine system according to an exemplary disclosed embodiment.
Figure 2:
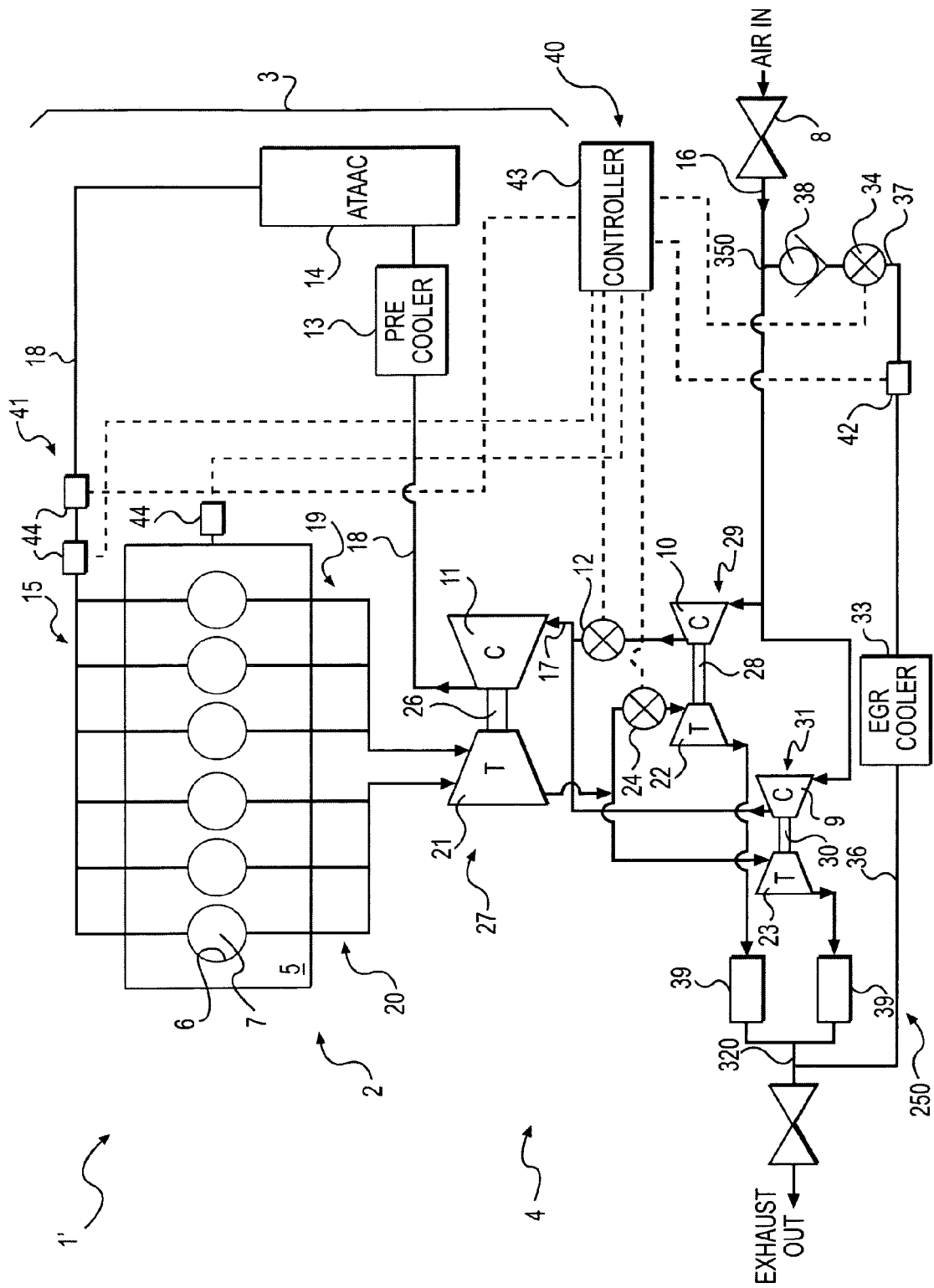
FIG. 2 is a diagrammatic illustration of another engine system according to an exemplary disclosed embodiment.

FIG. 1 and FIG. 2 illustrate an exemplary engine system 1, 1', respectively. Engine system 1, 1' may include a power source 2, an air intake system 3, and an exhaust system 4. For the purposes of this disclosure, power source 2 is depicted and described as a four-stroke diesel engine. One skilled in the art will recognize, however, that power source 2 may be any other type of combustion engine, such as, for example, a gasoline or a gaseous fuel powered engine. Power source 2 may include an engine block 5 that at least partially defines a plurality of cylinders 6. A piston (not shown) may be slidably disposed within each cylinder 6 to reciprocate between a top-dead-center position and a bottom-dead-center position, and a cylinder head (not shown) may be associated with each cylinder 6. Cylinder 6, the piston, and the cylinder head may form a combustion chamber 7. In the illustrated embodiment, power source 2 includes six such combustion chambers 7. However, it is contemplated that power source 2 may include a greater or lesser number of combustion chambers 7 and that combustion chambers 7 may be disposed in an "in-line" configuration, a "V" configuration, or in any other suitable combination.

Air intake system 3 may be configured to provide intake air to power source 2. Air intake system 3 may include an induction valve 8, a first compressor 9, a second compressor 10, a third compressor 11, a valve 12, a precooler 13, an air cooler 14, and an intake manifold 15. Induction valve 8 may be connected upstream of compressors 9, 10, and 11 via a first fluid passageway 16 and configured to regulate the flow of atmospheric air to power source 2. Each of compressors 9, 10, and 11 may embody a fixed geometry compressor, a variable geometry compressor, or any other type of compressor configured to receive air from induction valve 8 and compress the air to a predetermined boost level before it enters power source 2.

First compressor 9 and second compressor 10 may be coupled in parallel and arranged downstream of induction valve 8. Third compressor 11 may be arranged downstream of and coupled in series with first and second compressors 9, 10. A conduit 17 may provide fluid communication between third compressor 11 and first and second compressors 9, 10, such that compressed air from first and second compressors 9, 10 may be supplied to the third compressor 11. Third compressor 11 may in turn be coupled and deliver compressed air to power source 2 via a second fluid passageway 18.

Valve 12 may be associated with first compressor 9 and/or second compressor 10. As illustrated in the exemplary embodiments of FIG. 1 and FIG. 2, valve 12 is arranged downstream of second compressor 10. It is also contemplated that valve 12 may be arranged downstream of first compressor 9. Also, valve 12 may be arranged downstream of second compressor 10 and an additional valve 12 may be arranged downstream of first compressor 9. In the embodiments of FIG. 1 and FIG. 2, valve 12 may control a backflow of air to the second compressor 10 from third compressor 11. Valve 12 may also control a backflow of air to second compressor 10 from first compressor 9. Additionally, or alternatively, valve 12 may control the flow of air delivered to third compressor 11 from second compressor 10. In some embodiments, valve 12 may operate in either a fully open of a fully closed state. In the fully closed state, valve 12 may cut off the backflow of air to second compressor 10 from first compressor 9 and/or third compressor 11. Valve 12 may also cut off air to third compressor 11 from second compressor 10. Alternatively, valve 12 may operate in one or more intermediate operating states between fully open and fully closed. In some embodiments, the operating state of valve 12 may be adjusted through a continuous range of operating states.

Valve 12 may be any type of selectively controllable valve known in the art, such as, for example, a butterfly valve, a diaphragm valve, a ball valve, a poppet valve, or a globe valve. Valve 12 may be solenoid-actuated, hydraulically-actuated, pneumatically-actuated, or actuated in any other manner to at least partially restrict or cut off the backflow of air to second compressor 10. Additionally, or alternatively, valve 12 may embody a single three-position valve arranged downstream of first compressor 9 and second compressor 10. The three-position valve may selectively cut off the backflow of air to either first compressor 9 or second compressor 10. In a first position, the valve may allow air to flow from second compressor 10 to third compressor 12 and allow air to flow from first compressor 9 to third compressor 12. In a second position, the valve may allow air to flow from first compressor 9 and cut off the backflow of air to second compressor 10 from first compressor 9 and/or third compressor 12. In a third position, the valve may allow air to flow from second compressor 10 and may cut off the backflow of air to first compressor 9 from second compressor 10 and/or third compressor 12.

Precooler 13 may be arranged upstream of air cooler 14 and pre-cool compressed air from third compressor 11 prior to being received by air cooler 14. Precooler 13 may include a liquid-to-air heat exchanger, an air-to-air heat exchanger, or any other type of heat exchanger known in the art for cooling a compressed air.

Air cooler 14 may embody an air-to-air heat exchanger, an air-to-liquid heat exchanger, or a combination of both, and be configured to facilitate the transfer of thermal energy to or from the compressed air directed to power source 2. Air cooler 14 may be within second fluid passageway 18 and between power source 2 and third compressor 11, as illustrated in FIGS. 1 and 2. Additionally or alternatively, an additional air cooler 14 may be arranged between first and second compressors 9, 10 and third compressors 11. Compressed air delivered from air cooler 14 may enter combustion chambers 7 of power source 2 via intake manifold 15.

Exemplary embodiments of exhaust system 4 are disclosed in FIG. 1 and FIG. 2. Exhaust system 4 may be configured for exhausting exhaust gas from power source 2. Exhaust system 4 may include first and second exhaust manifolds 19 and 20 in communication with combustion chambers 7, first, second, and third exhaust turbines 21, 22, 23 associated with first and second exhaust manifolds 19, 20, a valve 24, and an exhaust gas recirculation (EGR) system 25 (FIG. 1), 250 (FIG. 2) fluidly communicating exhaust system 4 with air intake system 3. It is contemplated that exhaust system 4 may include components in addition to those listed above such as for example, particulate traps, constituent absorbers or reducers, and attenuation devices.

The exhaust gas produced during the combustion process within combustion chambers 7 may exit power source 2 via either first exhaust manifold 19 or second exhaust manifold 20. First exhaust manifold 19 may fluidly connect a first plurality of combustion chambers 7 of power source 2 (e.g., the first three combustion chambers from the right shown in FIG. 1 and FIG. 2) to first exhaust turbine 21. Second exhaust manifold 20 may fluidly connect a second plurality of combustion chambers 7 of power source 2 (e.g., the final three combustion chambers from the right shown in FIG. 1 and FIG. 2) to first exhaust turbine 21.

First exhaust turbine 21 may be arranged downstream from power source 2. Second and third exhaust turbines 22, 23 may be coupled in parallel and arranged downstream of and coupled in series with first exhaust turbine 21. First exhaust turbine 21 may be coupled to and drive third compressor 11, second exhaust turbine 22 may be coupled to and drive second compressor 10, and third exhaust turbine 23 may be coupled to and drive first compressor 9. For example, first exhaust turbine 21 may be directly and mechanically connected to third compressor 11 by way of a shaft 26 to form a first turbocharger 27. Similarly, second exhaust turbine 22 may be directly and mechanically connected to second compressor 10 by way of a shaft 28 to form a second turbocharger 29 and third exhaust turbine 23 may be directly and mechanically connected to first compressor 9 by way of a shaft 30 to form a third turbocharger 31. It is contemplated that first, second, and third turbochargers 27, 29, 31 may embody a fixed or variable geometry turbocharger. Hot exhaust gases exhausted from power source 2 may move through and rotate first, second, and third turbines 21, 22, 23 which may drive their respective compressors 11, 10, 9 to pressurize inlet air.

Valve 24 may be associated with second exhaust turbine 22 and third exhaust turbine 23. As illustrated in the exemplary embodiments of FIG. 1 and FIG. 2, valve 24 is arranged upstream of second exhaust turbine 22. It is also contemplated that valve 24 may be arranged upstream of third exhaust turbine 23. Also, valve 24 may be arranged upstream of second exhaust turbine 22 and an additional valve 24 may be arranged upstream of third exhaust turbine 23. Valve 24 may control the flow of exhaust gas delivered to second exhaust turbine 22. In some embodiments, valve 24 may operate in either a fully open or a fully closed state. In the fully closed state, valve 24 may cut off exhaust gas supplied to second exhaust turbine 22. Alternatively, valve 24 may operate in one or more intermediate operating states between fully open and fully closed. In some embodiments, the operating state of valve 24 may be adjusted through a continuous range of operating states.

Valve 24 may be any type of selectively controllable valve known in the art, such as, for example, a butterfly valve, a diaphragm valve, a ball valve, a poppet valve, or a globe valve. Valve 24 may be solenoid-actuated, hydraulically-actuated, pneumatically-actuated, or actuated in any other manner to at least partially restrict or cut off the flow of exhaust gas to second exhaust turbine 22. Additionally, or alternatively, valve 24 may embody a single three-position valve and be arranged upstream of second exhaust turbine 22 and third exhaust turbine 23. The three-position valve may selectively cut off exhaust gas to either second exhaust turbine 22 or third exhaust turbine 23. In a first position, the valve may allow exhaust gas to flow to both second and third exhaust turbines 22, 23. In a second position, the valve may cut off exhaust gas to second exhaust turbine 22 and allow exhaust gas to third exhaust turbine 23, and in a third position, the valve may cut off exhaust gas to third exhaust turbine 23 and allow exhaust gas to second exhaust turbine 22.

EGR systems 25 and 250 may be configured to redirect at least a portion of exhaust gas from exhaust system 4 back to air intake system 3. With reference to FIG. 1, EGR system 25 may be arranged upstream of first exhaust turbine 21 and may redirect a portion of exhaust gas produced by power source 2 from first exhaust manifold 19 to air intake system 3. It is also contemplated that EGR system 25 may redirect a portion of exhaust gas from second exhaust manifold 20 or from both first and second exhaust manifolds 19, 20. EGR system 25 may include an inlet port 32, an EGR cooler 33, a recirculation control valve 34, and a discharge port 35. As illustrated in FIG. 1, inlet port 32 may be fluidly connected to first exhaust manifold 19 upstream of first exhaust turbine 21 and fluidly connected to EGR cooler 33 via a third fluid passageway 36. Discharge port 35 may receive cooled exhaust gas from EGR cooler 33 via a fourth fluid passageway 37 and discharge the exhaust gas to air intake system 3 at a location downstream of air cooler 14. Recirculation control valve 34 may be disposed within fourth fluid passageway 37, between EGR cooler 33 and discharge port 35. It is further contemplated that a check valve 38, for example, a reed-type check valve 38 may be situated within fourth fluid passageway 37 upstream or downstream of recirculation control valve 34 at a location where exhaust mixes with inlet air to provide for a unidirectional flow of exhaust gas through EGR system 25 (i.e., inhibit bidirectional exhaust flow through EGR system 25), if desired.

With reference to FIG. 2, EGR system 250 may be arranged downstream of second and third exhaust turbines 22, 23 and may redirect a portion of exhaust gas produced by power source 2 from first, second, and exhaust third turbines 21, 22, 23 to air intake system 3. EGR system 250 may include an inlet port 320, EGR cooler 33, recirculation control valve 34, and a discharge port 350. As illustrated in FIG. 2, inlet port 320 may be downstream of and fluidly connected to first, second, and exhaust third turbines 21, 22, 23. EGR cooler 33 may be fluidly coupled to inlet port 320 via third fluid passageway 36. Discharge port 350 may receive cooled exhaust gas from EGR cooler 33 via fourth fluid passageway 37 and discharge the exhaust gas to air intake system 3 at a location downstream of induction valve 8 and upstream of second and third compressors 9, 10. Recirculation control valve 34 may be disposed within fourth fluid passageway 37, between EGR cooler 33 and discharge port 350. Check valve 38 may also be associated with EGR system 250 and situated within fourth fluid passageway 37 upstream or downstream of recirculation control valve 34. It is further contemplated that particulate filters 39 may be associated with EGR system 250 and arranged upstream of inlet port 320 to remove particulate matter from exhaust gas prior to being directed to air intake system 3.

Recirculation control valve 34 may control and regulate the flow of exhaust gas recirculated through EGR systems 25 (FIG. 1) and 250 (FIG. 2) and redirected to air intake system 3. Recirculation control valve 34 may be any type of selectively controllable valve known in the art, such as, for example, a butterfly valve, a diaphragm valve, a ball valve, a poppet valve, or a globe valve. In addition, recirculation control valve 34 may be solenoid-actuated, hydraulically-actuated, pneumatically-actuated, or actuated in any other manner to selectively restrict of completely block the flow of exhaust gas through third and fourth fluid passageways 36 and 37.

EGR cooler 33 may be configured to cool exhaust gas flowing through EGR systems 25, 250. EGR cooler 33 may include a liquid-to-air heat exchanger, an air-to-air heat exchanger, or any other type of heat exchanger known in the art for cooling an exhaust flow.

A control system 40 may be associated with exhaust system 4 and air intake system 3. Control system 40 may regulate exhaust gas flow in exhaust system 4, exhaust gas from exhaust system 4 to air intake system 3, and the delivery of air in air intake system 3. Control system 40 may include a sensor system 41, a sensor 42, and a controller 43 in communication with sensor system 41, sensor 42, valve 12, valve 24, and recirculation control valve 34. Based on signals received from sensor system 41, controller 43 may actuate valve 12, valve 24, and recirculation control valve 34. Additionally, controller 43 may actuate recirculation control valve 34 based on signals received from sensor 42.

Sensor system 41 may be associated with power source 2 and configured to generate signals indicative of a power output of power source 2. Sensor system 41 may include one or more sensors 44 configured to detect properties of power source 2 which may be associated with the power output of power source 2. For example, sensors 44 may sense the temperature of intake manifold 15 and the pressure of intake air within intake manifold 15. Sensors 44 may also detect and generate a signal indicative of a speed of power source 2. In the exemplary embodiment of an engine, sensors 44 may sense the rate at which a crankshaft of the engine is rotating. Sensor system 41 may also include a throttle position sensor associated with combustion chambers 7 of power source 2. The throttle position sensor may monitor the position, relative to a completely open position and completely closed position, of a throttle in power source 2. The position of the throttle may be related to fuel flow directed to combustions chambers 7. It should also be appreciated that sensor system 41 may include speed sensors configured to detect the rotational speed of first, second, and third exhaust turbines 21, 22, 23.

Although shown as located downstream of EGR cooler 33 and upstream of recirculation control valve 34, sensor 42 may alternatively be located anywhere within EGR systems 25 and 250 and embody, for example, a mass air flow sensor such as a hot wire anemometer or a venturi-type sensor configured to sense the amount, pressure, and/or a flow rate of exhaust gas redirected from exhaust system 4 and passing through EGR systems 25 and 250. Controller 43 may use signals produced by sensor 42 to determine and/or adjust a backpressure within first exhaust manifold 19 such that a desired amount of exhaust is recirculated back into power source 2 for subsequent combustion. Additionally or alternatively, controller 43 may determine the flow rate of exhaust gas redirected from exhaust system 4 based on various other sensors associated with EGR systems 25 and 250. For example, controller 43 may calculate flow rate of redirected exhaust gas based on exhaust gas temperature entering EGR cooler 33, exhaust gas pressure entering EGR cooler, exhaust gas temperature exiting EGR cooler 33, and intake manifold 15 pressure. The calculated flow rate may then be used to determine and/or adjust a desired amount of exhaust recirculated back into power source 2 for subsequent combustion.

Controller 43 may embody a single or multiple microprocessors, field programmable gate arrays (FPGAs), digital signal processors (DSPs), etc. that include a means for controlling an operation of engine system 1, 1' in response to signals received from sensor system 41 and sensor 42. Numerous commercially available microprocessors well known in the art can be configured to perform the functions of controller 43.

Controller 43 may receive data from sensor system 41 and determine a desired power output of power source 2. Controller 43 may utilize stored algorithms, equations, subroutines, look-up maps, and/or tables to analyze the data from sensor system 41 and determine the desired power output and a corresponding desired boost pressure level supplied by air intake system 3. For example, position data of the throttle may be associated with increases in fuel flow to combustion chambers 7 and may be utilized to determine a desired increase in power output. Appropriate boost pressure levels to produce the increased power output may then be calculated based on the current intake manifold 15 pressure, intake manifold 15 temperature, and/or speed of power source 2.

Based on the calculation of the appropriate and desired boost pressure levels, controller 43 may adjust operation of exhaust system 4. That is, controller 43 may, for example, actuate valve 24 to cut off exhaust gas to second exhaust turbine 22 and thereby increase exhaust gas to third exhaust turbine 23. The increase in exhaust gas supplied to third exhaust turbine 23 may increase the rotational acceleration of third exhaust turbine 23. As rotational acceleration of third exhaust turbine 23 increases, the pressurization and compression of inlet air by first compressor 9 may also increase. Controller 43 may also actuate valve 12 to cut off the backflow of compressed air from third compressor 11 and/or first compressor 9 flowing into second compressor 10. Closing of valve 12 may also prevent uncompressed air from second compressor 10 mixing with compressed air from first compressor 9 as it is directed to third compressor 11. The compressed air may be further pressurized and compressed by third compressor 11 and then delivered to intake manifold 15. While the compressed air is delivered to intake manifold 15 from third compressor 11, controller 43 may monitor data from sensor system 41 indicative of boost pressure levels and appropriately open valve 12 and valve 24 based on current boost pressure levels and the calculated desired boost pressure levels. As boost pressure supplied to combustion chambers 7 increases, controller 43 may appropriately increase the amount of fuel injected into combustion chambers 7 corresponding to the increased boost pressure and based on stored algorithms, equations, subroutines, look-up maps, and/or tables. Controller 43 may also monitor the rotational speeds of first, second, and third exhaust turbines 21, 22, 23 and prevent turbines 21, 22, and 23 from reaching excessive speeds predetermined by controller 43. For example, controller 43 may selectively open valve 24 to diverting exhaust gas to second exhaust turbine 22 if the increase of exhaust gas to third exhaust turbine 23 increases the rotational speed of third exhaust turbine 23 to excessive speeds.

As valves 12 and 24 are actuated to increase boost pressure supplied by turbochargers 27, 29, and 31, controller 43 may also selectively actuate recirculation control valve 34 of EGR systems 25 (FIG. 1) and 250 (FIG. 2). Actuating recirculation control valve 34 may cut off exhaust gas from reentering air intake system 3 via EGR systems 25 and 250. Therefore, a greater proportion of fresh, ambient intake air may be directed through air intake system 3 and into combustions chambers 7 in combination with increased boost pressure. In addition, and with reference to FIG. 1, cutting off exhaust gas through EGR system 25 may increase the amount of exhaust gas diverted to first turbine 21 via first manifold 19. This may increase the rotational acceleration of first turbine 21, which in turn may further increase the boost pressure supplied by air intake system 3.

Controller 43 may also determine a corresponding desired exhaust pressure and/or flow rate through EGR systems 25 and 250. Upon receiving input signals from sensor 42, controller 43 may perform a plurality of operations utilizing stored algorithms, equations, subroutines, look-up maps and/or tables to determine whether the flow rate or pressure of exhaust flowing through exhaust system 4 is within a desired range for producing the desired exhaust flow rate through EGR systems 25 and 250. In an alternate embodiment, it is contemplated that controller 43 may receive signals from various sensors (not shown) located throughout exhaust system 4 and/or engine system 1, 1' instead of sensor 42. Such sensors may sense parameters that may be used to calculate the flow rate or pressure of exhaust flowing through first exhaust manifold 19, if desired.

Based on the comparison of the actual EGR flow rate with the desired flow rates, controller 43 may adjust operation of exhaust system 4. Controller 43 may adjust the geometry of turbochargers 27, 29, 31 and/or operation of recirculation control valve 34 to affect the pressure within first exhaust manifold 19 and the resulting flow rate of exhaust gas through EGR systems 25 and 250. In one embodiment, controller 43 may primarily adjust operation of recirculation control valve 34 to achieve a desired flow rate of exhaust through EGR systems 25 and 250.

INDUSTRIAL APPLICABILITY

The disclosed engine system may be implemented into any power system application having a charged air induction system and an exhaust gas recirculation system. For example, any charged air induction system having multi-stage compression of air and any exhaust gas recirculation system configured to redirect at least a portion of exhaust gas from an exhaust system to an intake system of the engine system. Such a charged air induction system may include at least one stage of compression driven by a plurality of exhaust turbines arranged in parallel.

Referring to the exemplary engine system 1, 1' shown in FIG. 1 and FIG. 2, exhaust gas from power source 2 may be transported from first and second exhaust manifolds 19, 20 and to first turbocharger 27. The exhaust gas may impinge on and causes rotation of first exhaust turbine 21, which in turn causes rotation of third compressor 11.

Exhaust gas from first exhaust turbine 21 may then be transported to second and third exhaust turbines 22, 23 of second and third turbochargers 29, 31, coupled in parallel and arranged downstream of first exhaust turbine 21. The exhaust gas from first exhaust turbine 21 may impinge on and cause rotation of second and third exhaust turbines 22, 23, which in turn causes rotation of second and first compressors 10, 9, respectively. At least a portion of the exhaust gas may also be redirected back to air intake system 3 via EGR systems 25 and 250.

Rotation of first and second compressors 9, 10 may compress air drawn from the atmosphere via first fluid passageway 16 to a first pressure. The compressed air from both first and second compressors 9, 10 may then be supplied to third compressor 11. Third compressor 11 may further compress the air to a second pressure and supply the compressed air to intake manifold 15 of power source 2. Since third compressor 11 compresses air to a higher pressure than the first and second compressors 9, 10, third compressor 11 may be referred to as a high-pressure compressor and the first and second compressors 9, 10 may be referred to as low-pressure compressors.

During operation of engine system 1, 1', the operating states of valves 12 and 24 may affect operation of first, second, and third turbochargers 27, 29, 31. When valve 24 is closed, it may cut off fluid flow exhausted by first exhaust turbine 21 to second exhaust turbine 22. This may cause third exhaust turbine 23 to extract a high percentage of the energy of the fluid flow exhausted by first exhaust turbine 21. As a result, third turbocharger 31 may operate at relatively high speeds and deliver compressed air to third compressor 11 at a relatively high rate and pressure. Closing valve 12 may prevent back flow of compressed air from first compressor 9 and third compressor 11 to second compressor 10 and prevent uncompressed air from second compressor 10 from mixing with and decreasing the overall pressure of compressed air from first compressor 9 as it is directed to third compressor 11. Ultimately, the operation of valves 12 and 24 may increase the overall boost pressure delivered to intake manifold 15. In addition, because overall boost pressure may be quickly increased by merely closing valves 12 and 24, the rate of increase in boost pressure delivered to intake manifold 15 may also increase. Therefore, increases in power output by power source 2 may be produced more quickly.

Also during the operation of engine system 1, 1', the operating states of recirculation control valve 34 may affect operation of air intake system 3, exhaust system 4, and EGR systems 25 (FIG. 1) and 250 (FIG. 2). Recirculation control valve 34 may be tailored to control and/or adjust the desired amount of exhaust gas recirculated into air intake system 3. For example, and with reference to FIG. 1, the more recirculation control valve 34 is in the closed position, the less exhaust gas is recirculated back into intake manifold 15 and the greater the amount of fresh, ambient air directed to combustion chambers 7. Further, recirculation valve 34 may be actuated in combination with the actuation of valves 12 and 14 to further increase boost pressure to desired boost pressure levels. With reference to FIG. 2, the more recirculation control valve 34 is in the closed position, the less exhaust gas is recirculated back into first fluid passageway 16.

Controller 43 may control the operating states of valve 12, valve 24, and recirculation control valve 34 based on various signals from engine system 1, 1', such as, for example, sensor system 41 and sensor 42. For example, controller 43 may close valve 12, valve 24, and recirculation valve 34 to increase boost pressure supplied by air intake system 3 to a desired boost pressure level corresponding to a desired power output of power source 2 determined by controller 43. Controller 43 may open valves 12 and 24 to decrease boost pressure supplied by air intake system 3 and also increase the efficiency of the low-pressure compression stage. With valve 24 open, exhaust gas supplied by first exhaust turbine 21 may be split to second and third exhaust turbines 22, 23 and less rotational energy may be spent by each of second and third exhaust turbines 22, 23 to supply compressed air to third compressor 11. Controller 43 may also close or open recirculation control valve 34 to control the amount of exhaust gas recirculated to air intake system 3 based on the actual flow rate or pressure of exhaust gas within EGR system 25 (FIG. 1) and 250 (FIG. 2) sensed by sensor 42 to a desired amount determined by controller 43.

The disclosed engine system 1, 1' may therefore operate in and readily switch between high-boost applications and low-boost applications. In addition, engine system 1, 1' may provide efficient multi-stage turbocharging with the parallel arrangement of the low-pressure turbochargers 29 and 31. Also, by selectively and simultaneously actuating recirculation control valve 34 in combination with valves 12 and 24, engine system 1, 1' may provide an increased production of boost pressure with a decreased production of smoke generated by power source 2. Closing recirculation control valve 34 may provide an increase proportion of fresh, ambient intake air to combustion chambers 7, and therefore, a cleaner combustion of air and fuel. Finally, utilizing direct flow and pressure sensing and feedback control may provide precise regulation of boost pressure and exhaust recirculation may be possible.

It will be apparent to those skilled in the art that various modifications and variations can be made to the engine system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. An engine system including an engine, an intake system for providing intake air to the engine, and an exhaust system receiving exhaust gas from the engine, comprising:
    a first exhaust turbine arranged downstream of the engine;
    a second and third exhaust turbines coupled in parallel and arranged downstream of the first exhaust turbine;
    a first valve associated with the second and third exhaust turbines, the first valve configured to at least partially restrict exhaust gas to one of the second and third exhaust turbines and increase exhaust gas to the other turbine;
    a first compressor coupled to the third exhaust turbine;
    a second compressor coupled to the second exhaust turbine;
    a third compressor coupled to the first exhaust turbine;
    a second valve associated with one of the first and second compressors, the second valve configured to be selectively placed in one of an open position, a closed position, or a partially closed position that at least partially restricts a flow of air to one of the first and second compressors; and
    an exhaust gas recirculation system configured to redirect at least a portion of exhaust gas from the exhaust system to the intake system.

2. The engine system of claim 1, further including a sensor system associated with the engine and configured to generate signals indicative of a desired power output of the engine.

3. The engine system of claim 2, further including a controller in communication with the sensor system and configured to control actuation of the first valve in response to input from the sensor system.

4. The engine system of claim 3, wherein the exhaust gas recirculation system includes a control valve configured to regulate the amount of exhaust gas redirected to the intake system.

5. The engine system of claim 4, wherein the controller is configured to control actuation of the control valve in response to input from the sensor system.

6. The engine system of claim 5, further including a sensor associated with the exhaust gas recirculation system and configured to determine the amount of exhaust gas redirected from the exhaust system.

7. The engine system of claim 6, wherein the controller is configured to control actuation of the control valve in response to input from the sensor.

8. The engine system of claim 7, wherein the exhaust gas recirculation system is arranged upstream of the first exhaust turbine.

9. The engine system of claim 7, wherein the exhaust gas recirculation system is arranged downstream of the second and third exhaust turbines.

10. A method of directing exhaust gas of an engine system, the engine system including an engine, an intake system for providing intake air to the engine, and an exhaust system receiving exhaust gas from the engine, the method comprising:
    directing exhaust gas from the engine to a first exhaust turbine arranged downstream from the engine, the first exhaust turbine being coupled to a third compressor;
    directing exhaust gas from the first exhaust turbine to a second and third exhaust turbines coupled in parallel, the second exhaust turbine being arranged downstream of the first exhaust turbine, the second and third exhaust turbines being couple to second and first compressors, respectively;
    increasing boost pressure supplied by the intake system to the engine by selectively restricting exhaust gas to one of the second and third exhaust turbines and selectively restricting a flow of air to one of the first and second compressors from the third compressor; and
    directing at least a portion of exhaust gas from the exhaust system to the intake system.

11. The method of claim 10, wherein increasing boost pressure includes monitoring signals indicative of a desired power output of the engine.

12. The method of claim 11, wherein increasing boost pressure further includes increasing an acceleration of the other of the second and third exhaust turbines that is not restricted.

13. The method of claim 12, wherein increasing acceleration includes increasing exhaust gas to the other of the second and third exhaust turbines that is not restricted.

14. The method of claim 13, further including regulating the exhaust gas directed from the exhaust system to the intake system based on boost pressure supplied by the intake system.

15. A method of directing exhaust gas of an engine system, the engine system including an engine, an intake system for providing intake air to the engine, and an exhaust system receiving exhaust gas from the engine, the method comprising:
    directing exhaust gas from the engine to a first exhaust turbine arranged downstream from the engine, the first exhaust turbine being coupled to a third compressor;
    selectively directing exhaust gas from the first exhaust turbine to one of a second and a third exhaust turbines coupled in parallel by at least partially restricting exhaust gas to one of the second and third exhaust turbines and increasing the exhaust gas to the other, the second exhaust turbine being arranged downstream of the first exhaust turbine, the second and third exhaust turbines being couple to second and first compressors, respectively;
    selectively restricting a flow of air to one of the first and second compressors from the third compressor; and
    directing at least a portion of exhaust gas from the exhaust system to the intake system.

16. The method of claim 15, wherein selectively directing exhaust gas to one of the second and third exhaust turbines further includes monitoring signals indicative of a desired power output of the engine.

17. The method of claim 16, wherein selectively directing exhaust gas to one of the second and third exhaust turbines further includes increasing an acceleration of the other of the second and third exhaust turbines that is not at least partially restricted.

18. The method of claim 16, further including regulating the exhaust gas from the exhaust system to the intake system based on boost pressure supplied by the intake system.

19. The method of claim 15, further including regulating the amount of exhaust gas redirected to the intake system based on the amount of exhaust gas redirected from the exhaust system.

20. The engine system of claim 1, further including a controller configured to:
    close or partially close both the first valve and the second valve in response to a request for increased boost pressure; and
    open both the first valve and the second valve in response to a request for decreased boost pressure.

* * * * *